United States Patent Office 2,763,549
Patented Sept. 18, 1956

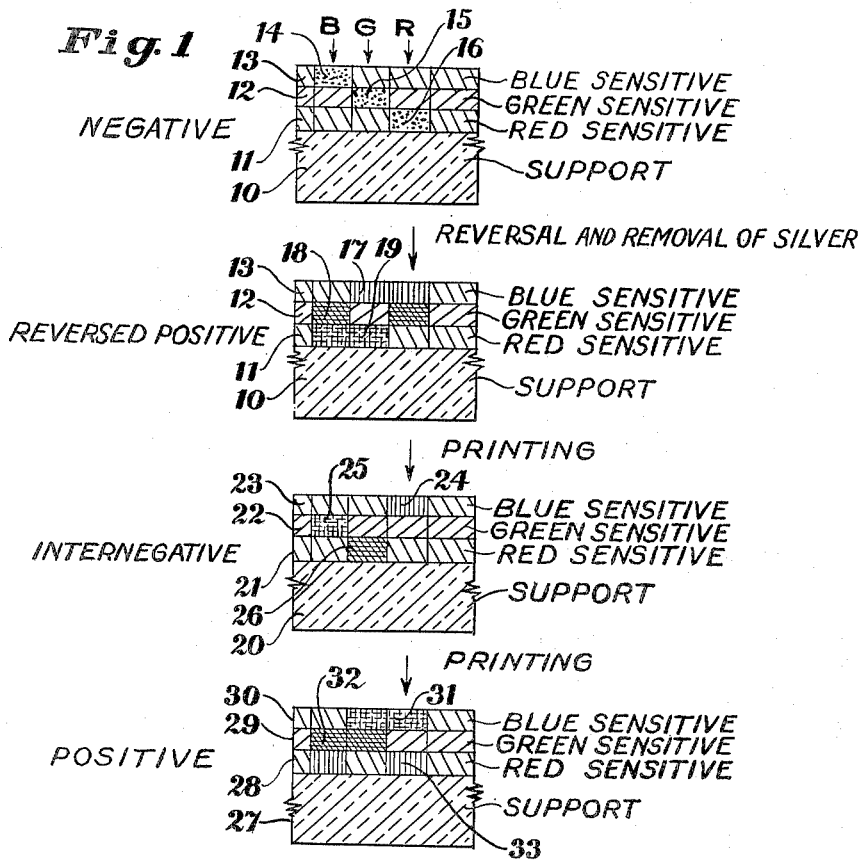
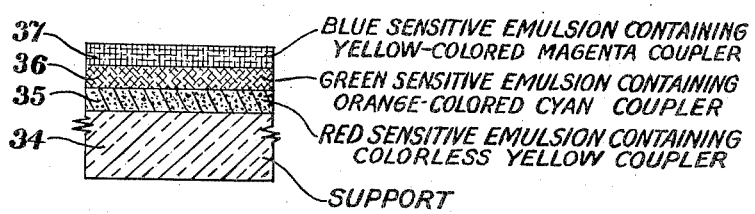

2,763,549

FALSE-COLOR OR FALSE-SENSITIZED PHOTOGRAPHIC FILM CONTAINING COLORED COUPLERS

Wesley T. Hanson, Jr., Rochester, N. Y., assignor to Eastman Kodak Company, Rochester, N. Y., a corporation of New Jersey Application November 3, 1951, Serial No. 254,679

1 Claim. (Cl. 95—2)

This invention relates to photography and particularly to photographic film containing colored couplers.

In the customary three-color multi-layer film the color of the images is complementary to the sensitivity of the emulsion and the images recorded in the film correspond to the sensitivity. Other arrangements of sensitivity and image records are possible and these are the subject of the present invention.

In subtractive color processes, image colors are used which are complementary to the primary colors, for example, which are yellow, magenta and cyan. These are known as subtractive colors. The emulsions are sensitized to the primary colors blue, green and red. The color separation images recorded in the emulsions by a camera film are the same as the sensitivities, that is the blue-sensitive emulsion records the blue color separation, etc., but in the case of a print film the color separations recorded by the emulsions may or may not be the same as the sensitivities, since the print may be made directly from a multi-layer negative or positive or from color separation images made from the original and printed through filters of different colors. These distinctions will be apparent from the following description of my invention, but these definitions must first be stated.

A "false-sensitized" color film is one in which the effective sensitivity of any emulsion is associated with the formation of a subtractive color image other than the one which is complementary to the effective sensitivity of that emulsion. The separation image recorded in the emulsion may or may not represent the same color as that of the effective sensitivity.

A "false-color" picture is one in which any of the primary-color areas of the original subject is reproduced by a dye or coloring material other than one which is complementary to the respective primary color. For example, blue color areas in the original are reproduced by magenta or cyan dye in the print material. The image color in the print may or may not be complementary to the sensitivity of the print material.

Typical color and sensitizing arrangements are illustrated in the following diagram:

|  | Sensitivity | Image Color | Image Aspect |
|---|---|---|---|
| Natural Sensitized Natural Color | Blue | Yellow | Blue |
|  | Green | Magenta | Green |
|  | Red | Cyan | Red |
| Natural Sensitized False Color | Blue | Yellow | Red |
|  | Green | Magenta | Blue |
|  | Red | Cyan | Green |
| False Sensitized Natural Color | Blue | Magenta | Green |
|  | Green | Cyan | Red |
|  | Red | Yellow | Blue |
| False Sensitized False Color | Blue | Magenta | Red |
|  | Green | Cyan | Blue |
|  | Red | Yellow | Green |

I have found that color reproduction with the false-sensitized materials or false-color photographs may be improved by incorporating colored color couplers in one or more layers of such material. Deficiencies of the subtractive dyes are thereby improved, as explained below, especially with the false-color photographs.

In the drawing, Fig. 1 shows sectional views of taking and printing films at successive stages in the process, the original color of the colored coupler being omitted for simplicity, and Fig. 2 is a sectional view of a different type of multi-layer film containing colored couplers according to my invention.

Colored couplers which are capable of coupling with the development product or oxidation product of primary aromatic amino developing agents to form a colored image and which in their uncoupled state have a color which absorbs light in the same spectral region as that of the undesired absorption of the coupled dye formed from them are described in my prior U. S. Patent 2,449,966. Couplers of this type are used in the false-sensitized film or in the film used to form the false-color photograph according to my invention.

One of the practical systems for making color pictures, particularly color motion pictures, involves the use of an original multi-layer taking material, which may be developed either to a negative or to a positive, printing onto an inter-negative material and then printing from the inter-negative onto a positive final print material. Any of these materials may be natural sensitized or false-sensitized and may be used in a manner to give natural color or false color images or both as long as the separation images of the final print material represent the same color aspects as those of the original subject. Obviously, the taking material may be a false-sensitized material and will automatically lead to false color images since the effective sensitivities of the emulsions must correspond to the color separations recorded in the material. Colored couplers can be incorporated in either the taking material or the inter-negative material but not in the print material since this material is designed for viewing the picture.

In the three-stage cycle, that is, original, internegative and print material, two types of original material will be described, the first being a false-sensitized material forming false color images and the second being a natural-sensitized, natural-color material. The false-sensitized material to be described will have the magenta image in the top, blue-sensitive layer, the cyan image in the middle, green-sensitive layer and the yellow image in the bottom, red-sensitive layer, since this arrangement gives the maximum effective speed in the camera. Obviously, other sensitivity and color arrangements can be used.

TYPE I.—ORIGINAL

In the first type, therefore, the original or camera material will have the following structure.

| Sensitivity | Image Color | Image Aspect |
|---|---|---|
| Blue | Magenta | Blue |
| Green | Cyan | Green |
| Red | Yellow | Red |

Colored couplers such as those listed below are used in the blue-sensitive and green-sensitive layers of this material, and after exposure the material is developed by reversal using the following formulas:

*Formula I*

|  | Grams |
|---|---|
| N-methyl-p-aminophenol sulfate | 6 |
| Hydroquinone | 10 |
| Sodium sulfite | 50 |
| Sodium carbonate | 30 |
| Potassium bromide | 5 |
| Potassium thiocyanate | ½ |

Water to 1000 cc.

After development for 10 minutes at 20° C., the film is washed fully exposed with white light and developed for 12 minutes in the following color developer.

*Formula II*

| | Grams |
|---|---|
| 2-amino-5-diethylaminotoluene hydrochloride | 2 |
| Sodium sulfite (anhydrous) | 2 |
| Sodium carbonate, monohydrate | 20 |
| Potassium bromide | 2 |
| Water to 1000 cc. | |

The film is then bleached, fixed, washed and dried in the usual manner.

TYPE I.—INTERNEGATIVE AND PRINT MATERIAL

The internegative material may be a natural-sensitized material or a false-sensitized material resulting in a false color image when printed from the orignal or may be a false-sensitized material so designed that it will give a natural color image when printed from the original or some of the layers may be natural-sensitized and the rest false-sensitized, in which case the image would be false-color. In the material on which prints are made from the internegative material, the pictures are natural color pictures in every case, since they are to be used for viewing. The print material may, however, be false-sensitized or natural-sensitized depending upon whether the image in the internegative is false color or natural color. In every case, the blue-sensitive layer is on top, the green-sensitive layer in the middle, and the red-sensitive layer on the bottom.

| | Internegative | | Print Material | |
|---|---|---|---|---|
| | Image Color | Image Aspect | Image Color | Image Aspect |
| 1 | Magenta | Red | Magenta | Green. |
| | Cyan | Blue | Cyan | Red. |
| | Yellow | Green | Yellow | Blue. |
| 2 | Cyan | Red | Yellow | Blue. |
| | Yellow | Blue | Magenta | Green. |
| | Magenta | Green | Cyan | Red. |
| 3 | Yellow | Red | Cyan | Red. |
| | Magenta | Blue | Yellow | Blue. |
| | Cyan | Green | Magenta | Green. |
| 4 | Cyan | Red | Magenta | Green. |
| | Magenta | Blue | Yellow | Blue. |
| | Yellow | Green | Cyan | Red. |
| 5 | Magenta | Red | Yellow | Blue. |
| | Yellow | Blue | Cyan | Red. |
| | Cyan | Green | Magenta | Green. |
| 6 | Yellow | Red | Cyan | Red. |
| | Cyan | Blue | Magenta | Green. |
| | Magenta | Green | Yellow | Blue. |

As mentioned above, the three stage system just described may contribute a number of advantages in color reproduction, obtained by changes in effects of the improper absorptions of the dyes.

The effects of the improper absorptions of the dyes in this false-sensitized original can be determined by the following reasoning: The magenta dye being in the blue sensitive layer is replacing the yellow dye in a normal process. So the red and blue absorptions of the magenta dye will contribute to the final image the same effects as green and red absorptions of the yellow dye of the normal process. Since in this process the yellow dye is in the red sensitive layer, blue density of the yellow dye will control the final cyan image. Similarly, the blue density of the magenta dye in the top layer will control some cyan image. It will thus behave like red density in the yellow dye of a normal process. The red density of the magenta dye in the top layer will contribute the same deficiencies to the final image as green density in the normal yellow dye.

Similarly, the blue and green absorptions of the cyan dye in the green sensitive layer will contribute to the final image the same deficiencies as red and blue absorption of the normal magenta dye. Its blue density will contribute cyan in the final image and its green density will contribute yellow. Thus, blue density of the cyan dye will behave like red density of the magenta dye in a normal process, and green density of cyan dye will behave like blue density of the magenta dye of a normal process.

In considering the original and the first arrangement of internegative and print material described above, the following absorptions are obtained. In the original the green absorption of the yellow dye behaves like blue absorption of the cyan dye in a natural-sensitized natural-color process. In the internegative, the green absorption of the yellow dye contributes the same image characteristics as red absorption in the magenta dye in a natural-color natural-sensitized process. However, this can be corrected by overcorrecting the blue absorption of the cyan dye in the original since this behaves like red absorption of magenta dye. This overcorrection can be made to cancel the defect occurring in the internegative film. Overcorrection of the green absorption of the cyan dye would behave like overcorrection for blue absorption of the magenta dye in a natural-color natural-sensitized process. By similar reasoning, the proper degree of overcorrection required to give the most advantageous color reproduction in all of the six arrangements described above can be determined. The residual unwanted absorptions of the image dyes which introduce color reproduction errors into the final print are shown in the following table. In this table the unwanted densities of the image-forming dyes are indicated as follows:

$C_B$ = blue density of cyan dye
$C_G$ = green density of cyan dye
$M_B$ = blue density of magenta dye
$M_R$ = red density of magenta dye
$Y_G$ = green density of yellow dye

| Type of Layer Arrangement | Type of Overcorrection | Improper Absorptions Uncorrected or Overcorrected |
|---|---|---|
| 1 | Overcorrect the orange colored cyan coupler in the original. | $C_B$ uncorrected. $M_B$ overcorrected. |
| 2 | Overcorrect the orange colored cyan coupler in the internegative. | $Y_G$ uncorrected. $C_G$ overcorrected. |
| 3 | No overcorrections | $C_B$ uncorrected in both stages. |
| 4 | Overcorrect the orange colored cyan coupler in both stages. | $M_R$ overcorrected. $C_G$ overcorrected. |
| 5 | Overcorrect the yellow colored magenta coupler in both stages. | No residual errors. |
| 6 | No overcorrections | $C_G$ uncorrected. $C_B$ uncorrected. |

TYPE II.—ORIGINAL

In the second type of original material, the film has the normal arrangement as follows:

| Sensitivity | Image Color | Image Aspect |
|---|---|---|
| Blue | Yellow | Blue. |
| Green | Magenta | Green. |
| Red | Cyan | Red. |

Colored couplers such as those listed below are used in the red-sensitive and green-sensitive layers of this material and after exposure it is developed to a negative in the following developer:

*Formula III*

| | Grams |
|---|---|
| 2-amino-5-diethylaminotoluene hydrochloride | 2 |
| Sodium sulfite (anhydrous) | 2 |
| Sodium carbonate, monohydrate | 20 |
| Potassium bromide | 2 |
| Water to 1000 cc. | |

Development is followed by an acid hardening fixing bath and removal of silver in the usual way.

TYPE II.—INTERNEGATIVE

The internegative material now to be described is false-sensitized. Its use as described herein leads to natural-color images in the internegative. This has the advantage over the Type I internegative material that it can be combined with a release print material of the natural-sensitized type for projection or viewing. The arrangement of the layers in this material is as follows:

| Sensitivity | Image Color | Image Aspect |
|---|---|---|
| Blue | Magenta | Green. |
| Green | Cyan | Red. |
| Red | Yellow | Blue. |

Since this is a false-sensitized material it cannot be printed directly from the Type II orignal material and in turn printed onto a natural-sensitized positive. Separation positives are first made from the original in the usual way using blue, green and red filters. The blue filter negative is printed through a red filter to form the blue image aspect in the bottom layer of the internegative, the green filter positive is printed through a blue filter to form the green image aspect in the top layer of the internegative and the red filter positive is printed through a green filter to form the red image aspect in the middle layer of the internegative.

The internegative film contains colored couplers in the blue-sensitive and green-sensitive layers, these couplers being illustrated more fully hereinafter. After exposure, the internegative film is developed to a negative image in the developer of Formula III and processed in the usual way.

TYPE II.—PRINT MATERIAL

The print material has the following structure:

| Sensitivity | Image Color | Image Aspect |
|---|---|---|
| Green | Magenta | Green. |
| Red | Cyan | Red. |
| Blue | Yellow | Blue. |

It is printed directly from the internegative and processed to a positive by development in the developer of Formula III and further processing in the usual way.

The Type II print material contains uncolored couplers of the type described in Jelley and Vittum U. S. Patent 2,322,027. It is a natural-sensitized material and when used as described herein gives natural color pictures.

Couplers

In the original and internegative material colored couplers are used to form the cyan and magenta images. The cyan couplers are colored yellow, red or orange and the magenta couplers are colored yellow. They are couplers having azo groups attached at the reactive position of the coupler as described in my prior Patent 2,449,966.

The following couplers are suitable for formation of the cyan dye:

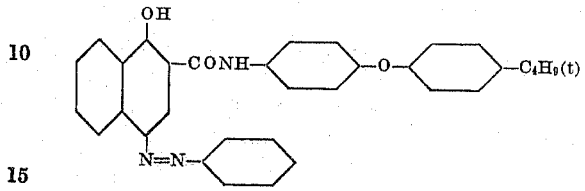

4'-(p-tert. butyl phenoxyl)-1-hydroxy-4-phenylazo-2-naphthanilide

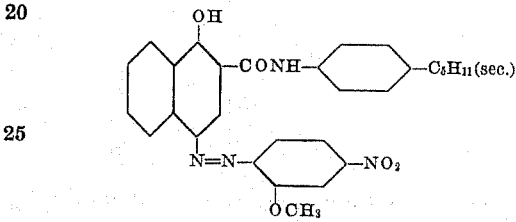

1-hydroxy-4(2'-methoxy-4'-nitrophenylazo)-2(4'-sec. amylphenyl) naphthamide

These couplers may be mixed with a suitable amount of the following couplers to obtain required amount of correction as described in Vittum and Arnold U. S. Patent 2,428,054.

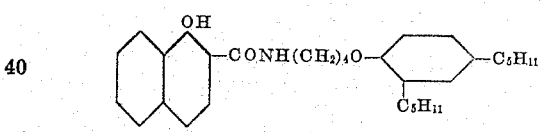

1-hydroxy-2-[α-(2,4-diamyl phenoxy-n-butyl)] naphthamide

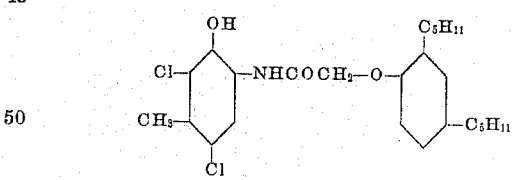

2-(2,4-diamylphenoxyacetamino)-4,6-dichloro-5-methyl phenol

The following couplers are suitable for formation of the magneta dye image in the original or internegative material:

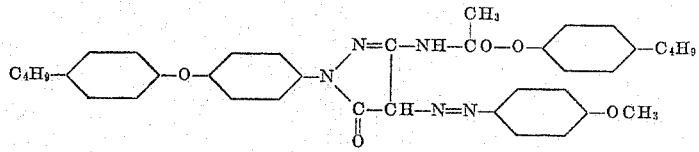

1-(p-tert. butylphenoxy) phenyl-3-α-(p-tert. butylphenoxy) propionylamino-4-p-methoxyphenylazo-5-pyrazolone

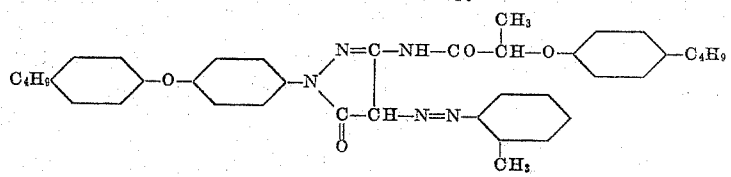

1-(p-tert.-butylphenoxy) phenyl-3-α-(p-tert. butylphenoxy)-propionylamino-4-o-toluene azo-5-pyrazolone These couplers may be mixed with a suitable amount of uncolored magenta coupler such as the following to give the desired correction ratio:

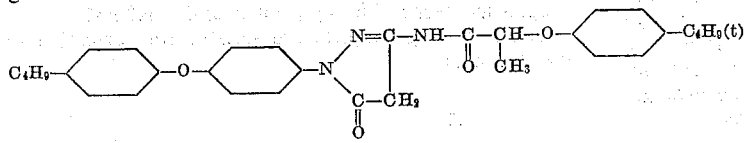

1-(p-tert.-butylphenoxy)-phenyl-3-α-(p-t-butylphenoxypropi-amino)-5-pyrazolone

The following yellow coupler is suitable for use in any of the original, internegative or print materials described above although a wide choice of yellow couples is available.

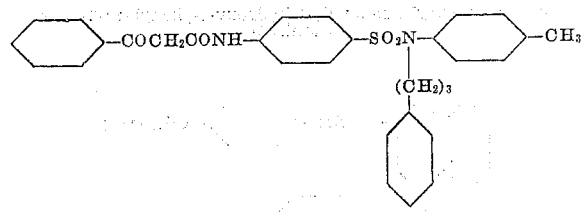

N(4-benzoylacetaminobenzenesulfonyl)-N-(γ-phenylpropyl)-p-toluidine

The following examples illustrate the preparation of a typical internegative material according to my invention:

1 coat.—A dispersion of N-(4-benzoylacetamino-benzene sulfonyl)-N-(γ-phenylpropyl)-p-toluidine and dioctyl hydroquinone was made by dissolving 0.86 g. of the coupler and 13 mg. of dioctyl hydroquinone in an equal weight of dibutyl phthalate with warming. This solution was poured into 10 cc. of a 10 percent gelatin solution containing 1.5 cc. of a 5 percent solution of sodium alkyl naphthalene sulfonate and the mixture passed through the colloid mill. This dispersion was added to 100 g. of a positive-speed, red-sensitized gelatino silver bromoiodide emulsion at 40° C. and suitable addenda to facilitate coating were added. The mixture weighed 320 grams and was coated on a suitable support at 59 grams per square foot.

2 coat.—A gelatin layer containing a dispersion of dioctyl hydroquinone in dibutyl phthalate was coated. A dispersion made essentially as described for the #1 coat but using 1.0 g. of dioctyl hydroquinone and 3 parts of solvent was made and added to 225 grams of 10 percent gelatin and with suitable coating addenda weighed 930 grams and was coated at 12 grams per square foot.

3 coat.—To 100 g. of a positive-speed, green-sensitized gelatino-silver bromoiodide emulsion was added a mixture of 0.18 g. of 4'-(p-tert.-butyl phenoxy)-1-hydroxy-4-phenylazo-2-naphthanilide and 0.22 g. of 1-hydroxy-2-[α-(2,4-diamyl phenoxy-n-butyl)]-naphthamide dissolved in 0.8 cc. of tri-o-cresyl phosphate, added to gelatin containing sodium alkyl naphthalene sulfonate and passed through the colloid mill in the same manner as that described for the #1 coat. The material with suitable coating addenda now weighed 400 grams and was coated at approximately 46 grams per square foot.

4 coat.—Made up like the #2 coat but the final weight was 2000 grams, and was coated at 10 grams per square foot.

5 coat.—To 100 g. of an unsensitized positive-speed, gelatino-silver bromoiodide emulsion was added a dispersion of 0.95 g. of 1-(p-tert.-butyl phenoxy)-phenyl-3-α-(p-tert.-butyl phenoxy)-propionylamino-4-o-toluene-azo-5-pyrazolone in 4 g. of tri-o-cresyl phosphate prepared as described in the #1 coat. A suitable amount of tartrazine and fluorescein is then added so that the materials would, when diffused through the coating, prevent the under layers of the sensitized emulsion being exposed to blue light. The material with coating addenda weighed 450 g. and was coated at 26 grams per square foot.

My invention will now be described by reference to the accompanying drawing.

As shown in the first stage of Fig. 1, a sensitive material comprising a support 10 and layers 11, 12 and 13, sensitive respectively to the red, green and blue spectral regions is exposed to an image, the image being illustrated as bands of blue, green and red, to form negative silver images 14, 15 and 16 in the blue-sensitive, green-sensitive and red-sensitive layers respectively. After reversal exposure, color development and removal of the silver, the film has a magenta image 17 in layer 13, a cyan image 18 in layer 12, and a yellow image 19 in layer 11 as shown in the second stage of the drawing.

The original is printed onto a negative material shown in the third stage of Fig. 1 comprising a support 20 having layers 21, 22 and 23 sensitive respectively to the red, green and blue spectral regions coated thereon. Upon color development this material produces from suitable couplers incorporated in the emulsion layers the magenta image 24 in layer 23, a yellow image 25 in layer 22, and a cyan image 26 in layer 21.

The internegative is printed onto a print material shown in the fourth stage of Fig. 1 comprising a support 27 having thereon emulsion layers 28, 29 and 30 sensitive respectively to the red, green and blue spectral regions. Upon color development of this material which contains appropriate couplers in the emulsion layers, a yellow image 31 is formed in layer 30, a cyan image 32 is formed in layer 29 and a magenta image 33 is formed in layer 28. This results in a natural color photograph and can be used for projection or viewing. The couplers in the original material and in the internegative material are uncolored yellow-forming couplers and colored cyan-forming and magenta-forming couplers, the color of the original coupler being omitted in the drawing for simplicity.

A different type of inter-negative material is illustrated in Fig. 2 of the drawing. As shown therein, a support 34 has coated thereon a red-sensitive emulsion 35 containing a colorless yellow-forming coupler, a green-sensitive emulsion 36 containing an orange colored cyan coupler and a blue-sensitive emulsion 37 containing a yellow colored magenta-forming coupler. This is an inter-negative material and its formation has been described above.

It will be understood that the examples and modifications herein are illustrative only and my invention is to be taken as limited only by the scope of the appended claim.

I claim:

A photographic element comprising a support having thereon three superposed silver halide emulsion layers each sensitive to one of the primary colors, each of said layers containing a different color coupler capable of coupling with the development product of a primary aromatic amino developing agent, the coupler in the blue sensitive emulsion layer being yellow in its uncoupled state and forming a magenta dye on coupling, the coupler in the green-sensitive emulsion layer being orange in its uncoupled state and forming a cyan dye on coupling, and the coupler in the red-sensitive emulsion layer being colorless in its uncoupled state and forming a yellow dye on coupling.

References Cited in the file of this patent

UNITED STATES PATENTS

| | | |
|---|---|---|
| 2,183,393 | Gasper | Dec. 12, 1939 |
| 2,193,931 | Michaelis | Mar. 19, 1940 |
| 2,224,329 | Wilmanns | Dec. 10, 1940 |
| 2,230,590 | Eggert et al. | Feb. 4, 1941 |
| 2,231,685 | Seymour | Feb. 11, 1941 |
| 2,306,410 | Schinzel | Dec. 29, 1942 |
| 2,434,272 | Jelley et al. | Jan. 13, 1948 |
| 2,435,616 | Vittum et al. | Feb. 10, 1948 |
| 2,449,966 | Hanson | Sept. 21, 1948 |

FOREIGN PATENTS

| | | |
|---|---|---|
| 375,338 | Great Britain | June 24, 1932 |